(12) United States Patent
Ishiga

(10) Patent No.: US 8,797,428 B2
(45) Date of Patent: Aug. 5, 2014

(54) MAXIMUM AND MINIMUM FILTER IN MOSAIC IMAGE

(75) Inventor: Kenichi Ishiga, Yokohama (JP)

(73) Assignee: Nikon Corporation, Tokyo (JP)

( * ) Notice: Subject to any disclaimer, the term of this patent is extended or adjusted under 35 U.S.C. 154(b) by 697 days.

(21) Appl. No.: 12/952,467

(22) Filed: Nov. 23, 2010

(65) Prior Publication Data

US 2011/0234842 A1 Sep. 29, 2011

(30) Foreign Application Priority Data

Nov. 26, 2009 (JP) .................................. 2009-268929
Nov. 12, 2010 (JP) .................................. 2010-253882

(51) Int. Cl.
*H04N 9/64* (2006.01)
*G06K 9/38* (2006.01)

(52) U.S. Cl.
USPC ........................................................ 348/246

(58) Field of Classification Search
USPC ............ 348/246, 223.1, 229.1, 273, 277–280; 382/273
See application file for complete search history.

(56) References Cited

U.S. PATENT DOCUMENTS

| | | | |
|---|---|---|---|
| 5,327,246 A | 7/1994 | Suzuki | |
| 6,034,741 A | 3/2000 | Pennino et al. | |
| 6,836,572 B2 | 12/2004 | Ishiga et al. | |
| 7,202,894 B2 | 4/2007 | Kaplinsky et al. | |
| 2004/0032516 A1 | 2/2004 | Kakarala | |
| 2006/0115177 A1 | 6/2006 | Ishiga | |
| 2008/0100727 A1* | 5/2008 | Seki et al. | 348/246 |
| 2008/0273102 A1 | 11/2008 | Hyakutake et al. | |
| 2009/0079853 A1 | 3/2009 | Hoshuyama et al. | |
| 2009/0231473 A1* | 9/2009 | Shimoozono et al. | 348/246 |
| 2011/0080505 A1* | 4/2011 | Ogino | 348/246 |
| 2011/0102649 A1* | 5/2011 | Hashizume | 348/246 |

FOREIGN PATENT DOCUMENTS

| | | |
|---|---|---|
| JP | A-4-304091 | 10/1992 |
| JP | A-2000-308082 | 11/2000 |
| JP | A-2004-80761 | 3/2004 |
| JP | A-2006-229626 | 8/2006 |
| JP | A-2008-301481 | 12/2008 |
| JP | A-2009-105872 | 5/2009 |

OTHER PUBLICATIONS

Jul. 10, 2012 Office Action issued in Japanese Patent Application No. 2010-253882 (with translation).

* cited by examiner

*Primary Examiner* — Lin Ye
*Assistant Examiner* — Mekonnen Dagnew
(74) *Attorney, Agent, or Firm* — Oliff PLC

(57) ABSTRACT

An image processing device that corrects a pixel value in image data, includes: an input unit that inputs image data having a plurality of color components and including a plurality of pixels each holding one color component; a calculation unit that calculates a maximum value among pixel values of a plurality of same-color neighboring pixels each holding a color component identical to a color component held in a processing target pixel selected from the pixels included in the image data and pixel values of a plurality of different-color neighboring pixels each holding a color component different from the color component held in the processing target pixel, which take up positions closer to the processing target pixel than the plurality of same-color neighboring pixels; and a correction unit that compares a pixel value of the processing target pixel with the maximum value and replaces the pixel value of the processing target pixel with the maximum value if the pixel value of the processing target pixel is greater than the maximum value.

16 Claims, 10 Drawing Sheets

FIG.6A

| R | G | R | G | R | G | R | G | R |
|---|---|---|---|---|---|---|---|---|
| G | B | G | B | G | B | G | B | G |
| R | G | R | G | R | G | R | G | R |
| G | B | G | B | G | B | G | B | G |
| R | G | R | G | ▨ | G | R | G | R |
| G | B | G | B | G | B | G | B | G |
| R | G | R | G | R | G | R | G | R |
| G | B | G | B | G | B | G | B | G |
| R | G | R | G | R | G | R | G | R |

FIG.6B

| B | G | B | G | B | G | B | G | B |
|---|---|---|---|---|---|---|---|---|
| G | R | G | R | G | R | G | R | G |
| B | G | B | G | B | G | B | G | B |
| G | R | G | R | G | R | G | R | G |
| B | G | B | G | ▨ | G | B | G | B |
| G | R | G | R | G | R | G | R | G |
| B | G | B | G | B | G | B | G | B |
| G | R | G | R | G | R | G | R | G |
| B | G | B | G | B | G | B | G | B |

FIG.6C

| G | B | G | B | G | B | G | B | G |
|---|---|---|---|---|---|---|---|---|
| R | G | R | G | R | G | R | G | R |
| G | B | G | B | G | B | G | B | G |
| R | G | R | G | R | G | R | G | R |
| G | B | G | B | ▨ | B | G | B | G |
| R | G | R | G | R | G | R | G | R |
| G | B | G | B | G | B | G | B | G |
| R | G | R | G | R | G | R | G | R |
| G | B | G | B | G | B | G | B | G |

FIG.9

MAXIMUM AND MINIMUM FILTER IN MOSAIC IMAGE

INCORPORATION BY REFERENCE

The disclosures of the following priority applications are herein incorporated by reference:
Japanese Patent Application No. 2009-268929 filed Nov. 26, 2009; and
Japanese Patent Application No. 2010-253882 filed Nov. 12, 2010.

BACKGROUND OF THE INVENTION

1. Field of the Invention

The present invention relates to an image processing device.

2. Description of Related Art

There is a defective pixel correction method known in the related art for repairing defective pixels (hot pixels/cold pixels) manifesting as white blemishes or black blemishes on a single plate color image sensor with a color filter arrangement in, for instance, a Bayer array with Max/Min filters applied directly on the Bayer plane by referencing eight neighboring same-color pixels assuming the same color within a 5×5 pixel range (see, for instance, U.S. Pat. No. 7,202,894).

SUMMARY OF THE INVENTION

However, there is an issue yet to be addressed with this method in that an isolated bright spot, such as a star in a celestial image, may be erased and a color artifact, i.e., coloration that is not real, may occur around the star, leading to breakdown of the image structure. In addition, in a photographic image of a night scene with densely distributed bright spots with higher levels of brightness, such as city lights, the brightness levels of the bright spots may be adjusted to a uniform brightness, to result in the point images of the individual bright spots resolved as an anomalous linear structure made up with a series of point images connected together and ultimately, in breakdown of the image structure.

According to the 1st aspect of the present invention, an image processing device that corrects a pixel value in image data, comprises: an input unit that inputs image data having a plurality of color components and including a plurality of pixels each holding one color component among the plurality of color components; a calculation unit that calculates a maximum value among pixel values of a plurality of same-color neighboring pixels each holding a color component identical to a color component held in a processing target pixel selected from the pixels included in the image data and pixel values of a plurality of different-color neighboring pixels each holding a color component different from the color component held in the processing target pixel, which take up positions closer to the processing target pixel than the plurality of same-color neighboring pixels; and a correction unit that compares a pixel value of the processing target pixel with the maximum value and replaces the pixel value of the processing target pixel with the maximum value if the pixel value of the processing target pixel is greater than the maximum value.

According to the 2nd aspect of the present invention, an image processing device that corrects a pixel value in image data, comprises: an input unit that inputs image data having a plurality of color components and including a plurality of pixels each holding one color component among the plurality of color components; a calculation unit that calculates a maximum value among pixel values of a plurality of neighboring pixels, which include, at least, pixel values of a plurality of different-color neighboring pixels each holding a color component different from a color component held in a processing target pixel selected from the pixels included in the image data taking up a position closer to the processing target pixel than a plurality of same-color neighboring pixels each holding a color component identical to the color component held in the processing target pixel; and a correction unit that compares a pixel value of the processing target pixel with the maximum value and replaces the pixel value of the processing target pixel with the maximum value if the pixel value of the processing target pixel is greater than the maximum value.

According to the 3rd aspect of the present invention, an image processing device that corrects a pixel value in image data, comprises: an input unit that inputs image data having a plurality of color components and including a plurality of pixels each holding one color component among the plurality of color components; a calculation unit that calculates a minimum value among pixel values of a plurality of same-color neighboring pixels each holding a color components identical to a color component held in a processing target pixel selected from the pixels included in the image data and pixel values of a plurality of different-color neighboring pixels each holding a color component different from the color component held in the processing target pixel, which take up positions closer to the processing target pixel than the plurality of same-color neighboring pixels; and a correction unit that compares a pixel value of the processing target pixel with the minimum value and replaces the pixel value of the processing target pixel with the minimum value if the pixel value of the processing target pixel is smaller than the minimum value.

According to the 4th aspect of the present invention, an image processing device that corrects a pixel value in image data, comprises: an input unit that inputs image data having a plurality of color components and including a plurality of pixels each holding one color component among the plurality of color components; a calculation unit that calculates a minimum value among pixel values of a plurality of neighboring pixels, which include, at least, pixel values of a plurality of different-color neighboring pixels each holding a color component different from a color component held in a processing target pixel selected from the pixels included in the image data taking up a position closer to the processing target pixel than a plurality of same-color neighboring pixels each holding a color component identical to the color component held in the processing target pixel; and a correction unit that compares a pixel value of the processing target pixel with the minimum value and replaces the pixel value of the processing target pixel with the minimum value if the pixel value of the processing target pixel is smaller than the minimum value.

According to the 5th aspect of the present invention, in the image processing device according to the 1st aspect, it is preferred that: the calculation unit further calculates a minimum value among the pixel values of the pixels having been referenced when calculating the maximum value; the image processing device further comprises a setting unit that calculates a difference by subtracting the minimum value from the maximum value having been calculated and sets a value obtained by multiplying the difference by a constant as a threshold value for the processing target pixel; and the correction unit compares the pixel value of the processing target pixel with a sum obtained by adding the threshold value to the maximum value and replaces the pixel value of the processing target pixel with the maximum value if the pixel value of the processing target pixel is greater than the sum.

According to the 6th aspect of the present invention, in the image processing device according to the 2nd aspect, it is preferred that: the calculation unit further calculates a minimum value among the pixel values of the pixels having been referenced when calculating the maximum value; the image processing device further comprises a setting unit that calculates a difference by subtracting the minimum value from the maximum value having been calculated and sets a value obtained by multiplying the difference by a constant as a threshold value for the processing target pixel; and the correction unit compares the pixel value of the processing target pixel with a sum obtained by adding the threshold value to the maximum value and replaces the pixel value of the processing target pixel with the maximum value if the pixel value of the processing target pixel is greater than the sum.

According to the 7th aspect of the present invention, in the image processing device according to the 3rd aspect, it is preferred that: the calculation unit further calculates a maximum value among the pixel values of the pixels having been referenced when calculating the minimum value; the image processing device further comprises a setting unit that calculates a difference by subtracting the minimum value from the maximum value having been calculated and sets a value obtained by multiplying the difference by a constant as a threshold value for the processing target pixel; and the correction unit compares the pixel value of the processing target pixel with a remainder obtained by subtracting the threshold value from the minimum value and replaces the pixel value of the processing target pixel with a minimum value if the pixel value of the processing target pixel is smaller than the remainder.

According to the 8th aspect of the present invention, in the image processing device according to the 4th aspect, it is preferred that: the calculation unit further calculates a maximum value among the pixel values of the pixels having been referenced when calculating the minimum value; the image processing device further comprises a setting unit that calculates a difference by subtracting the minimum value from the maximum value having been calculated and sets a value obtained by multiplying the difference by a constant as a threshold value for the processing target pixel; and the correction unit compares the pixel value of the processing target pixel with a remainder obtained by subtracting the threshold value from the minimum value and replaces the pixel value of the processing target pixel with a minimum value if the pixel value of the processing target pixel is even smaller than the remainder.

According to the 9th aspect of the present invention, in the image processing device according to the 1st aspect, it is preferred that the calculation unit references the pixel values of the different-color pixels having undergone gain adjustment executed in reference to the color component held in the processing target pixel by using a white balance adjustment value determined in advance among the color components of the image data.

According to the 10th aspect of the present invention, in the image processing device according to the 2nd aspect, it is preferred that the calculation unit references the pixel values of the different-color pixels having undergone gain adjustment executed in reference to the color component held in the processing target pixel by using a white balance adjustment value determined in advance among the color components of the image data.

According to the 11th aspect of the present invention, in the image processing device according to the 3rd aspect, it is preferred that the calculation unit references the pixel values of the different-color pixels having undergone gain adjustment executed in reference to the color component held in the processing target pixel by using a white balance adjustment value determined in advance among the color components of the image data.

According to the 12th aspect of the present invention, in the image processing device according to the 4th aspect, it is preferred that the calculation unit references the pixel values of the different-color pixels having undergone gain adjustment executed in reference to the color component held in the processing target pixel by using a white balance adjustment value determined in advance among the color components of the image data.

According to the 13th aspect of the present invention, in the image processing device according to the 1st aspect, it is preferred that when the image data assumes a square grid array format, the calculation unit uses pixel values of different-color pixels present within a 3×3 pixel range centered on the processing target pixel as the pixel values of the plurality of different-color neighboring pixels.

According to the 14th aspect of the present invention, in the image processing device according to the 2nd aspect, it is preferred that when the image data assumes a square grid array format, the calculation unit uses pixel values of different-color pixels present within a 3×3 pixel range centered on the processing target pixel as the pixel values of the plurality of different-color neighboring pixels.

According to the 15th aspect of the present invention, in the image processing device according to the 3rd aspect, it is preferred that when the image data assumes a square grid array format, the calculation unit uses pixel values of different-color pixels present within a 3×3 pixel range centered on the processing target pixel as the pixel values of the plurality of different-color neighboring pixels.

According to the 16th aspect of the present invention, in the image processing device according to the 4th aspect, it is preferred that when the image data assumes a square grid array format, the calculation unit uses pixel values of different-color pixels present within a 3×3 pixel range centered on the processing target pixel as the pixel values of the plurality of different-color neighboring pixels.

According to the 17th aspect of the present invention, an image processing device that corrects a pixel value in image data, comprises: an input unit that inputs image data having at least one color component and including a plurality of pixels in all of which the color component is commonly held; a calculation unit that calculates a maximum value and a minimum value among pixel values of a plurality of neighboring pixels surrounding a processing target pixel selected from the pixels included in the image data; a setting unit that calculates a difference by subtracting the calculated minimum value from the calculated maximum value and sets a value obtained by multiplying the difference by a constant as a threshold for the processing target pixel; and a correction unit that compares a pixel value of the processing target pixel with a sum obtained by adding the threshold value to the maximum value and replaces the pixel value of the processing target pixel with the maximum value if the pixel value of the processing target pixel is greater than the sum.

According to the 18th aspect of the present invention, an image processing device that corrects a pixel value in image data, comprises: an input unit that inputs image data having at least one color component and including a plurality of pixels in all of which the color component is commonly held; a calculation unit that calculates a maximum value and a minimum value among pixel values of a plurality of neighboring pixels surrounding a processing target pixel selected from the pixels included in the image data; a setting unit that calculates a difference by subtracting the calculated minimum value from the calculated maximum value and sets a value obtained by multiplying the difference by a constant, as a threshold for the processing target pixel; and a correction unit that compares a pixel value of the processing target pixel with a remainder obtained by subtracting the threshold value from the minimum value and replaces the pixel value of the processing target pixel with the minimum value if the pixel value of the processing target pixel is smaller than the remainder.

According to the 19th aspect of the present invention, in the image processing device according to the 17th aspect, it is preferred that the correction unit replaces the pixel value of the processing target pixel with a value falling within a range between the maximum value and the sum.

According to the 20th aspect of the present invention, in the image processing device according to the 18th aspect, it is preferred that the correction unit replaces the pixel value of the processing target pixel with a value falling within a range between the minimum value and the remainder.

BRIEF DESCRIPTION OF THE DRAWINGS

FIGS. 6A-6C each schematically indicate a pixel that may be designated as a correction target pixel in the second embodiment and neighboring pixels around the correction target pixel.

FIG. 9 schematically illustrates the hot pixel/cold pixel correction method adopted in fifth and sixth embodiments.

DESCRIPTION OF PREFERRED EMBODIMENTS

First Embodiment

Figure 1:
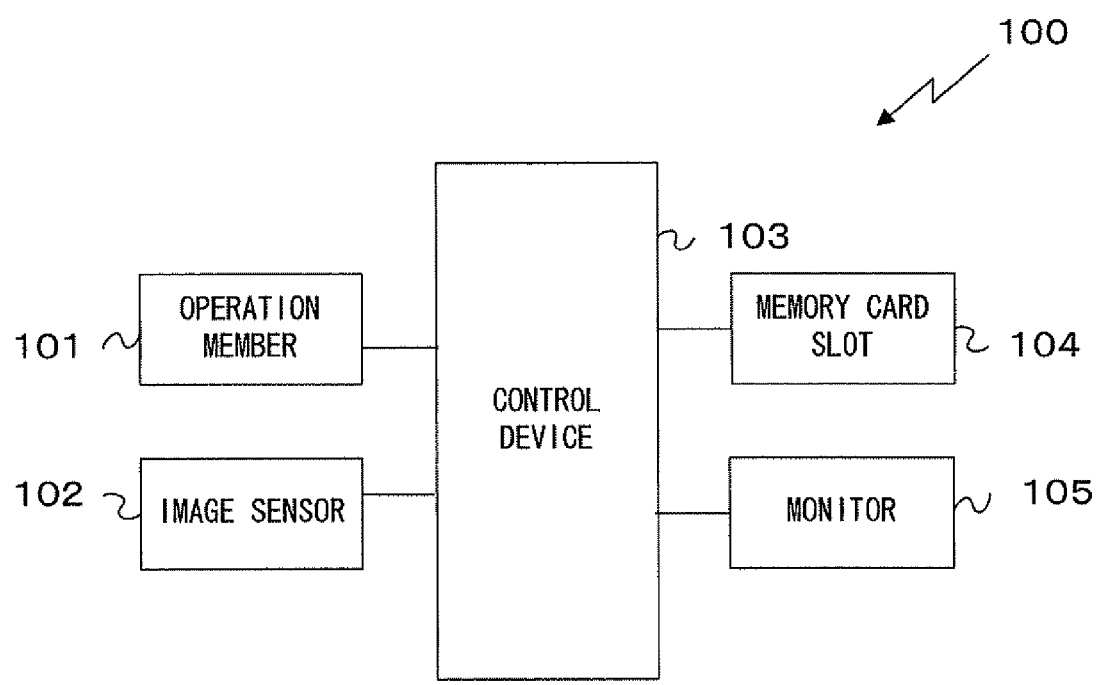
FIG. 1 is a block diagram showing the structure of a camera achieved in an embodiment.

FIG. 1 is a block diagram of a structural mode that may be adopted in the camera achieved in the first embodiment. A camera 100 comprises an operation member 101, an image sensor 102, a control device 103, a memory card slot 104 and a monitor 105. The operation member 101 includes various input members operated by the user, such as a power button, a shutter release button, a zoom button, a cross key, an OK button, a reproduce button and a delete button.

The image sensor 102, which may be a CCD image sensor or a CMOS image sensor, captures a subject image formed through a lens (not shown). Image signals expressing the captured image are then output to the control device 103. It is to be noted that a detachable lens barrel is mounted at the camera 100 and that the subject image is formed at the image sensor 102 via a plurality of lenses constituting the lens barrel.

The control device 103, constituted with a CPU, a memory and various peripheral circuits, controls the camera 100. It is to be noted that the memory in the control device 103 includes an SDRAM and a flash memory. The SDRAM, which is a volatile memory, is used as a work memory where a program executed by the CPU is opened for program execution or as a buffer area where data are temporarily recorded. The flash memory, on the other hand, is a nonvolatile memory where data for the program executed by the control device 103, various parameters that are read during the program execution and the like are recorded.

The memory card slot 104 is a slot where a memory card, used as a storage medium, is loaded, and an image file generated through photographing processing executed by the control device 103 is written and thus recorded in the memory card. The control device 103 is also able to read out an image file stored in the memory card via the memory card slot 104.

At the monitor 105, which is a liquid crystal monitor (rear-side monitor) mounted at the rear surface of the camera 100, an image stored in the memory card, a setting menu enabling selection of settings for the camera 100, and the like are displayed. In addition, as the user sets the camera in a photographing mode, the control device 103 outputs display image data for images obtained from the image sensor 102 in time series to the monitor 105. A live view image (through image) is thus brought up on display at the monitor 105.

It is assumed that the image sensor 102 in the camera 100 achieved in the embodiment is a single plate color image sensor, R (red), G (green) and B (blue) color filters disposed in a Bayer array on the image capturing surface. In other words, image data output from the image sensor 102 to the control device 103 express an image in the RGB colorimetric system and each of the pixels constituting the image data holds color information corresponding to one of the three color components, R, G and B.

When such an image sensor 102 undergoes lengthy exposure, a significant number of pixels will indicate markedly higher levels of brightness and markedly lower levels of brightness relative to their neighboring pixels, instead of indicating brightness levels in direct proportion to the length of storage time. These pixels, which are normally referred to as hot pixels and cold pixels, tend to appear at a greater rate as the length of exposure time increases or as the image capturing sensitivity becomes higher.

These defective pixels are usually repaired or corrected by using digital filters. For instance, U.S. Pat. No. 5,327,246 discloses a Max/Min filter used to repair defective pixels by calculating a maximum value or a minimum value among the pixel values indicated at eight neighboring pixels present in a 3×3 pixel range in a single color signal plane and replacing the value indicated at the central pixel with the maximum value or the minimum value if the value markedly deviates from the values indicated at the neighboring pixels by an extent exceeding a predetermined threshold value. U.S. Pat. No. 5,327,246 further proposes that when processing signals input from a single plate color image sensor assuming a Bayer array or the like, luminance signal/chrominance signal generation processing be first executed by using a digital filter and then the Max/Min filter be applied by factoring in the effect of possible bleeding from any deviant pixel with markedly high or low level into adjacent pixels on the luminance plane or the chrominance plane.

U.S. Pat. No. 7,202,894 discloses a method whereby a Max/Min filter is applied directly on the Bayer plane by referencing eight neighboring same-color pixels assuming the same color as the subject pixel in a 5×5 pixel range. Max/Min filter application implemented prior to the RGB color interpolation, as in this method, is effective in keeping subsequent processing simple, since the adverse effect of each deviant pixel is not allowed to manifest as a bleeding component in neighboring pixels through the interpolation processing. However, there is an issue yet to be addressed with this method in that an isolated bright spot, such as a star in a celestial image, may be erased and a color artifact, i.e., coloration that is not real, may occur around the star, leading to breakdown of the image structure. In addition, in a photographic image of a night scene with densely distributed bright spots with higher levels of brightness, such as Christmas lights, the brightness levels of the bright spots may be adjusted to a uniform brightness, to result in the point images of the bright spots resolved as a strange linear structure made up with a series of point images connected together and ultimately in breakdown of the image structure.

This issue is addressed in the camera 100 achieved in the embodiment by also referencing different-color pixel signals sampled from positions closer to the subject pixel position, as well as the same-color pixel signals sampled from neighboring pixel positions further from the subject pixel position when applying the Max/Min filter on the single plate color image sensor plane. Through these measures, defective pixels manifesting as spots with markedly high or low brightness can be successfully corrected while minimizing the extent of breakdown of image structure. It is to be noted that while the embodiment is described by assuming that the present invention is adopted in a single plate color image sensor, the present invention may also be adopted effectively in a two-plate image sensor achieved by combining a plate with pixels corresponding to two colors, i.e., R and B, disposed in a checker pattern and a plate with pixels corresponding to a single color, i.e., G, disposed over the entire surface, or in a two-plate image sensor achieved by combining a plate with pixels corresponding to the three colors set in a Bayer array and a plate with pixels corresponding to the three colors set in the Bayer array.

Figure 2:
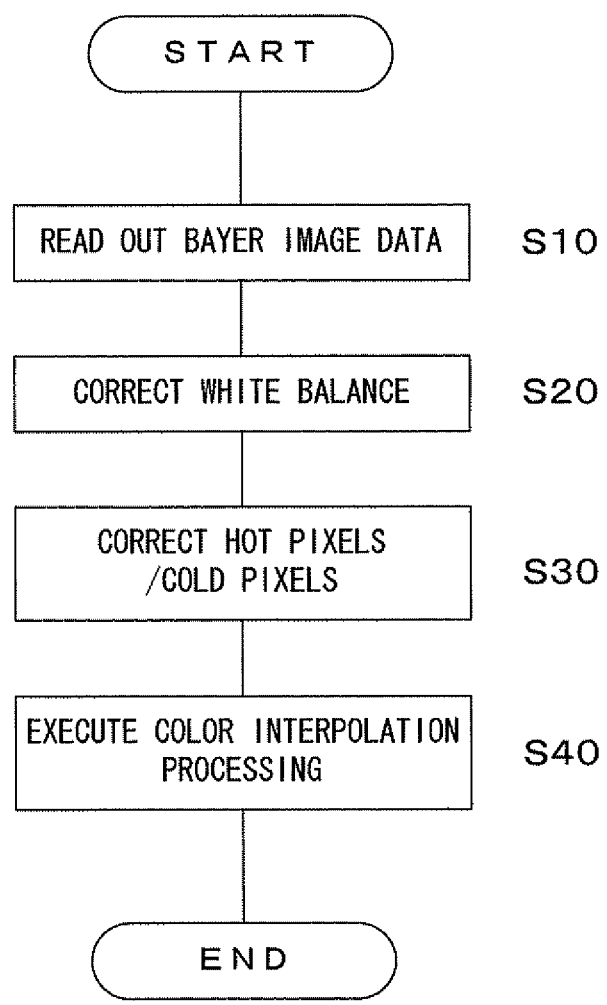
FIG. 2 presents a flowchart of the processing executed in a first embodiment.

In more specific terms, the control device 103 executes the processing shown in the flowchart presented in FIG. 2. In step S10, the control device 103 reads out Bayer image data from the image sensor 102. Bayer image data assuming a linear gradation relative to the amount of light are thus input to the control device 103.

The operation then proceeds to step S20 in which the control device 103 executes white balance correction. For instance, if the white balance gains among the R color, the G color and the B color are R/G=k1 and B/G=k2, the control device 103 applies a gain that is a multiple of k1 to each R pixel on the Bayer plane and applies a gain that is a multiple of k2 to each B pixel on the Bayer plane. The operation then proceeds to step S30.

In step S30, the control device 103 repairs hot pixels and cold pixels as mentioned earlier. More specifically, the control device 103 executes hot pixel correction and cold pixel correction by following the procedural sequence described in (A) to (C) below. It is to be noted that in the following description, Sin[i, j] represents the pixel value indicated at a correction target pixel [i, j] in the Bayer image data having undergone the white balance correction and that a corrected pixel value Sout[i, j] for the correction target pixel [i, j] is output by applying a deviance removal filter to Sin[i, j]. In addition, the following explanation is given by assuming that a simple filter circuit can be configured by defining a common filter that can be used in conjunction with any of the color components on the Bayer plane.

(A) Data Copy

The control device 103 copies the data as expressed in (1) below. In other words, the initial image data are saved into a buffer memory allocated to Sin.

$$Sout[i,j] = Sin[i,j] \quad (1)$$

(B) Hot Pixel Correction with Max Filter

Figure 3:
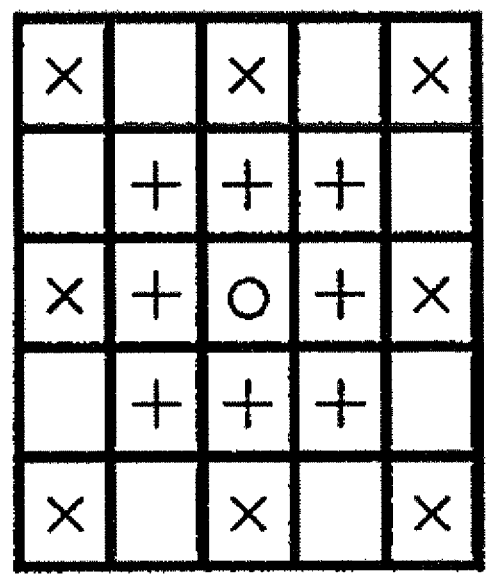
FIG. 3 is a schematic illustration of a hot pixel/cold pixel correction filter used in the first embodiment.

The control device 103 executes hot pixel correction with a Max filter applied to the image data by referencing neighboring pixels including different-color neighboring pixels, as expressed in (2) through (5) below. It is to be noted that the embodiment is described by assuming that the image data are output from pixels disposed in a square grid array and that the Max filter in the embodiment references 16 neighboring pixels present within a 5×5 pixel range centered on the correction target pixel indicated by the "O", as shown in FIG. 3. Such a Max filter can be used as a universal filter regardless of the color of the correction target pixel, i.e., when the correction target pixel is an R pixel, a B pixel or a G pixel.

Figure 4A:
FIGS. 4A-4C each schematically indicate a pixel that may be designated as a correction target pixel in the first embodiment and neighboring pixels present around the correction target pixel.
Figure 4B:
Figure 4C:

Namely, when the correction target pixel is an R pixel, as shown in FIG. 4A, the Max filter is applied by referencing eight different-color pixels (B pixels and G pixels) each indicated with a "+" mark, assuming inner positions in the filter, and eight same-color pixels (R pixels) each indicated by an "x" mark assuming peripheral positions in the filter. Likewise, when the correction target pixel is a B pixel, as shown in FIG. 4B, the Max filter is applied by referencing eight different-color pixels (R pixels and G pixels) each indicated with a "+" mark, assuming inner positions in the filter and eight same-color pixels (B pixels) each indicated by "x" assuming peripheral positions in the filter. In addition, when the correction target pixel is a G pixel, as shown in FIG. 4C, the Max filter is applied in conjunction with eight pixels including different-color pixels (R pixels and B pixels) and same-color pixels (G pixels) each indicated with a "+" mark, assuming inner positions in the filter and eight same-color pixels (G pixels) each indicated by an "x" mark, assuming peripheral positions in the filter.

The control device 103, using the Max filter shown in FIG. 3, is able to correct the correction target pixel by referencing the pixel values indicated at the same-color pixels present within the 5×5 pixel range centered on the correction target pixel and also the pixel values indicated at different-color pixels present within the 3×3 pixel range centered on the correction target pixel, which assume positions closer to the correction target pixel than the same-color pixels. Within the 3×3 pixel range centered on the correction target pixel, different-color pixels occupy positions adjacent to an R or B correction target pixel along the vertical direction, the horizontal direction and the diagonal directions, whereas different-color pixels occupy positions adjacent to a G correction target pixel along the vertical direction and the horizontal direction but same-color pixels occupy positions adjacent to the G correction target pixel along the diagonal directions, as indicated in the FIGS. 4A-4C. It is to be noted that the upper case letters MAX in expressions (2) through (5) below represents a function that returns the maximum value.

$$max1 = MAX\{Sin[i-1,j], Sin[i+1,j], Sin[i,j-1], Sin[i,j+1], Sin[i-1,j-1], Sin[i+1,j+1], Sin[i-1,j+1], Sin[i+1,j-1]\} \quad (2)$$

$$max2 = MAX\{Sin[i-2,j], Sin[i+2,j], Sin[i,j-2], Sin[i,j+2], Sin[i-2,j-2], Sin[i+2,j+2], Sin[i-2,j+2], Sin[i+2,j-2]\} \quad (3)$$

$$max = MAX\{max1, max2\} \quad (4)$$

$$if\ (Sin[i,j] > max + Thmax) \rightarrow Sout[i,j] = max \quad (5)$$

(C) Cold Pixel Correction with Min Filter

The control device 103 executes cold pixel correction with a Min filter applied to the image data by referencing neighboring pixels including different-color neighboring pixels, as expressed in (6) through (9) below. It is to be noted that the Min filter used for cold pixel correction is similar to the Max filter described earlier in that it is applied by referencing 16 neighboring pixels present in the 5×5 pixel range centered on the correction target pixel indicated by "O", i.e., eight different-color pixels each indicated by "+" and eight same-color pixels each indicated by "x", as shown in FIG. 3. However, as is the case with the Max filter, the pixels indicated by "+" in conjunction with the G correction target pixel is made up with four different-color pixels and four same-color pixels. It is to be noted that the upper case letters MIN in expressions (6) through (9) below represents a function that returns the minimum value.

$$\text{min1}=\text{MIN}\{Sin[i-1,j],Sin[i+1,j],Sin[i,j-1],Sin[i,j+1], \\ Sin[i-1,j-1],Sin[i+1,j+1],Sin[i-1,j+1],Sin[i+1,j-1]\} \quad (6)$$

$$\text{min2}=\text{MIN}\{Sin[i-2,j],Sin[i+2,j],Sin[i,j-2],Sin[i,j+2], \\ Sin[i-2,j-2],Sin[i+2,j+2],Sin[i-2,j+2],Sin[i+2,j-2]\} \quad (7)$$

$$\text{min}=\text{MIN}\{\text{min1},\text{min2}\} \quad (8)$$

$$\text{if } (Sin[i,j]<\text{min}-Th\text{min}) \rightarrow Sout[i,j]=\text{min} \quad (9)$$

While breakdown of image structure can be more effectively prevented by assuming larger values for threshold values Thmax and Thmin in expressions (5) and (8), the filter effect diminishes when larger values are taken for the threshold values. Accordingly, the threshold values Thmax and Thmin may both be set to, for instance, 0 in the embodiment, since better image structure conservation is assured with a shorter referencing distance set in conjunction with the reference pixels constituting the Max and Min filters and thus, it is not necessary to set actual threshold values for purposes of preventing image structure breakdown.

The breakdown of image structure described earlier can be prevented by incorporating different-color pixels taking up closest positions to the correction target pixel, as well as same-color pixels, in the Max and Min filters for the following reason. Namely, a point image such as an image of a star, cannot be captured as a light signal corresponding to a single pixel only under normal circumstances, due to blurring attributable to the optical system and bleeding into adjacent pixels is inevitable. This bleeding occurs as a combination of the light beam separation characteristics attributable to the optical low pass filter and the characteristics of the lens point spread function. For instance, if a four-point separation type optical low pass filter with a pitch equal to the pixel pitch at the image sensor or a pitch equivalent to ¾ of the pixel pitch at the image sensor is inserted, light is bound to leak into the four adjacent pixels in substantially equal quantities.

A pixel defect such as a hot pixel or a cold pixel, in contrast, is normally limited to a single pixel. For this reason, the brightness level at a hot pixel or a cold pixel at a position overlapping a point image such as an image of a star will be substituted with the brightness level of the point image of the star bled into the surrounding area. As a result, the risk of eliminating the image of the star in the celestial image can be significantly reduced. The value to replace the brightness value at the defective pixel can be estimated with a very high level of accuracy by using pixels at positions closer to the correction target pixel than the positions of same-color pixels in the Max/Min filters in the related art. Consequently, better protection of image resolution is assured and undesirable color artifacts caused by erroneous estimates can be prevented. Furthermore, formation of a distorted line constituted of connected point images can be effectively prevented.

The results of tests conducted by processing the entire image plane of a photographic image of a circular zone plate, normally used for purposes of image resolution evaluation with these Max/Min filters, which incorporate different-color pixels, have confirmed that the image structure can be kept substantially intact. In addition, the extent to which the contrast is lowered can be greatly reduced over the Max/Min filters in the related art achieved by referencing same-color pixels only.

In a rough estimation, an image with a defective pixel rate of up to approximately 4%, i.e., with a defective pixel present in every 5×5 pixel area, can be corrected substantially perfectly through the single-pixel defect correction achieved in the first embodiment. If either hot pixels or cold pixels manifest with greater pixel density, a defect manifesting over two consecutive hot pixels or two consecutive cold pixels will remain uncorrected within the 5×5 pixel range but any other defective pixels will be cleanly corrected. It is to be noted that by taking the second largest value (second Max) instead of the maximum value (Max) in expression (4) and taking the second smallest value (second Min) instead of the minimum value (Min) in expression (8), a defect manifesting over two consecutive hot pixels or two consecutive cold pixels can be successfully corrected.

Specific conditions under which the Max filter for hot pixel correction and the Min filter for cold pixel correction (hot pixel/cold pixel correction filters) are to be utilized, should be determined in advance in correspondence to the photographing conditions, Namely, the hot pixel/cold pixel correction filters should be in the ON state when the exposure is executed over a period equal to or longer than a specific exposure time length. A shorter exposure period should be set in correspondence to a higher level of ISO sensitivity.

Subsequently, the operation proceeds to step S40, in which the control device 103 executes color interpolation processing. Namely, color interpolation processing for generating information corresponding to the three colors, R, G and B for each pixel is executed by adopting a technology of the known art. The processing then ends.

The following advantages are achieved through the first embodiment described above.

(1) The control device 103 uses the Max filter, which functions as expressed in (2) through (5) so as to correct each hot pixel by calculating a maximum value among the pixel values indicated at a plurality of same-color neighboring pixels holding the same-color component as the color component at the correction target pixel and the pixel values indicated as a plurality of different-color neighboring pixels holding color components different from that of the correction target pixel, which take up positions closer to the correction target pixel than the plurality of same-color neighboring pixels and then by replacing the pixel value at the correction target pixel with the maximum value having been calculated if the pixel value at the correction target pixel is greater than the calculated maximum value. Through these measures, hot pixels can be corrected while keeping the image structure intact.

(2) The control device 103 uses the Min filter, which functions as expressed in (6) through (9) so as to correct each cold pixel by calculating a minimum value among the pixel values indicated at a plurality of same-color neighboring pixels holding the same-color component as the color component at the correction target pixel and the pixel values indicated as a plurality of different-color neighboring pixels holding color components different from that of the correction target pixel, which take up positions closer to the correction target pixel than the plurality of same-color neighboring pixels and then by replacing the pixel value at the correction target pixel with the minimum value having been calculated if the pixel value at the correction target pixel is smaller than the calculated minimum value. Through these measures, cold pixels can be corrected while keeping the image structure intact.

(3) The pixel values used as the different-color pixel values by the control device 103 will have undergone gain adjustment executed in reference to the color component at the correction target pixel by using white balance adjustment values determined in advance for the different color components of image data. Thus, since the R, G and B signal levels are all adjusted before the hot pixel/cold pixel correction filter application, the correction values can be estimated with better accuracy and the image structure can be kept intact more reliably.

(4) The pixel values at the plurality of different-color neighboring pixels referenced in conjunction with the Max filter and the Min filter for the correction processing are taken from a 3×3 pixel range centered on the correction target pixel. As a result, better resolving power is assured for the spatial resolution and any defective pixel manifesting as a deviant point can be effectively corrected while minimizing the extent of breakdown of image structure.

Second Embodiment

In the first embodiment described above, hot pixel/cold pixel correction is executed with the Max filter by replacing pixel values from 16 neighboring pixels including different-color pixels, all present within a 5×5 pixel range, as shown in FIG. 3, in step S30 in the flowchart presented in FIG. 2. In the second embodiment, hot pixel/cold pixel correction is executed with a Max filter and a Min filter that references the pixel values sampled at 24 neighboring pixels including different-color pixels present within a 9×9 pixel range centered on the correction target pixel indicated by "O" in FIG. 5.

Namely, when the correction target pixel is an R pixel, as shown in FIG. 6A, the Max filter is applied by referencing eight different-color pixels each indicated with a "+" mark, assuming inner positions in the filter and 16 same-color pixels each indicated by an "x" mark assuming peripheral positions in the filter. Likewise, when the correction target pixel is a B pixel, as shown in FIG. 6B, the Max filter is applied by referencing eight different-color pixels each indicated with a "+" mark, assuming inner positions in the filter and 16 same-color pixels each indicated by an "x" mark assuming peripheral positions in the filter. In addition, when the correction target pixel is a G pixel, as shown in FIG. 6C, the Max filter is applied by referencing eight pixels including different-color pixels and same-color pixels each indicated with a "±" mark, assuming inner positions in the filter and 16 same-color pixels each indicated by an "x" mark assuming peripheral positions in the filter.

Figure 5:
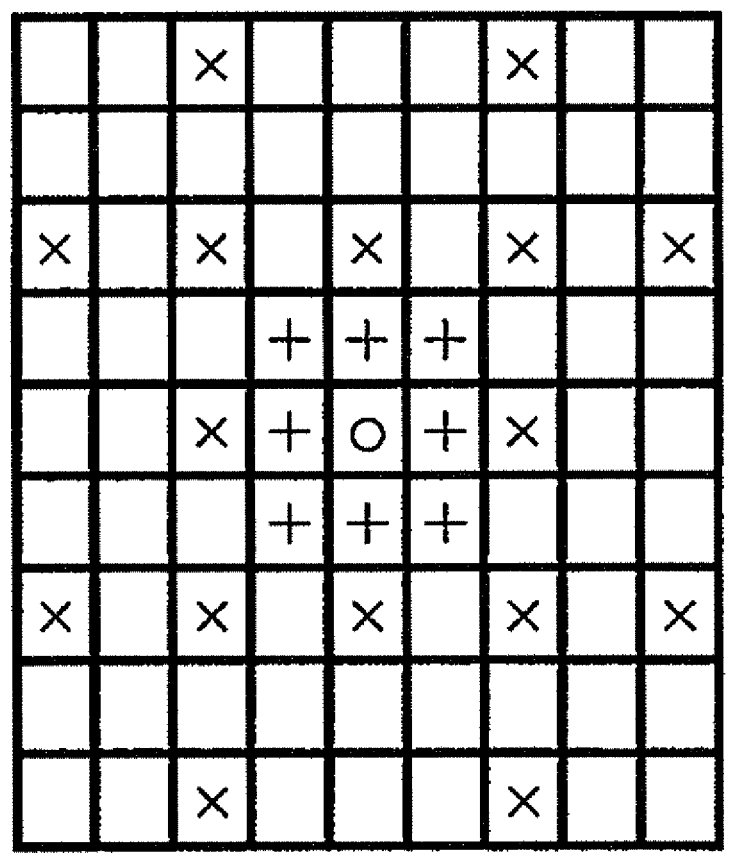
FIG. 5 is a schematic illustration of a hot pixel/cold pixel correction filter used in a second embodiment.

The use of the hot pixel/cold pixel correction filters shown in FIG. 5 allows same-color pixels to be referenced along directions set in finer angular increments than in the hot pixel/cold pixel correction filters achieved in the first embodiment. Namely, the same-color pixels indicated by an "x" mark in FIG. 3 take up eight peripheral pixel positions within the 5×5 pixel range and these eight same-color pixels are present along the horizontal direction, along the vertical direction and along the 45° diagonal directions. The hot pixel/cold pixel correction filters in FIG. 5 are distinguishable in that the same-color pixels indicated by an "x" mark in the figure include eight pixels taking up outermost positions within the 9×9 pixel range in addition to the eight pixels in FIG. 3. This means that same-color pixels taking up positions along referencing directions set with finer angular increments relative to the correction target pixel are referenced in addition to the same-color pixels present along the horizontal direction, the vertical direction and the diagonal directions in FIG. 3.

By setting same-color pixel referencing directions in finer angular increments, as described above, the image structure can be kept intact even more reliably. It is to be noted, however, that the hot pixel/cold pixel correction filters in the second embodiment are best used under photographing conditions in which the density of pixels each manifesting a single-pixel defect is low, since the probability of a consecutive-pixel defect appearing in the 9×9 pixel range is higher than the probability of such a consecutive-pixel defect manifesting in the 5×5 pixel range set in the first embodiment when the density of pixels manifesting single-pixel defects is high. It is to be noted that the processing executed in the second embodiment in steps other than step S30 in the flowchart presented in FIG. 2 is identical to that described in reference to the first embodiment and that the block diagram in FIG. 1 also applies to the second embodiment. Accordingly, a repeated explanation is not provided.

The control device 103 in the second embodiment executes hot pixel correction by applying a Max filter, which references different-color neighboring pixels as well, to the image data, as expressed in (10) through (14) below in the procedural phase (B) in step S30 in the flowchart presented in FIG. 2.

$$\max1 = \text{MAX}\{Sin[i-1,j], Sin[i+1,j], Sin[i,j-1], Sin[i,j+1], Sin[i-1,j-1], Sin[i+1,j+1], Sin[i-1,j+1], Sin[i+1,j-1]\} \quad (10)$$

$$\max2 = \text{MAX}\{Sin[i-2,j], Sin[i+2,j], Sin[i,j-2], Sin[i,j+2], Sin[i-2,j-2], Sin[i+2,j+2], Sin[i-2,j+2], Sin[i+2,j-2]\} \quad (11)$$

$$\max3 = \text{MAX}\{Sin[i-4,j-2], Sin[i-4,j+2], Sin[i+4,j-2], Sin[i+4,j+2], Sin[i-2,j-4], Sin[i+2,j-4], Sin[i-2,j+4], Sin[i+2,j+4]\} \quad (12)$$

$$\max = \text{MAX}\{\max1, \max2, \max3\} \quad (13)$$

$$\text{if } (Sin[i,j] > \max + Th\max) \rightarrow Sout[i,j] = \max \quad (14)$$

The control device 103 executes cold pixel correction by applying a Min filter, which references different-color neighboring pixels as well, to the image data, as expressed in (15) through (19) below in the procedural phase (C) in step S30 in the flowchart presented in FIG. 2.

$$\min1 = \text{MIN}\{Sin[i-1,j], Sin[i+1,j], Sin[i,j-1], Sin[i,j+1], Sin[i-1,j-1], Sin[i+1,j+1], Sin[i-1,j+1], Sin[i+1,j-1]\} \quad (15)$$

$$\min2 = \text{MIN}\{Sin[i-2,j], Sin[i+2,j], Sin[i,j-2], Sin[i,j+2], Sin[i-2,j-2], Sin[i+2,j+2], Sin[i-2,j+2], Sin[i+2,j-2]\} \quad (16)$$

$$\min3 = \text{MIN}\{Sin[i-4,j-2], Sin[i-4,j+2], Sin[i+4,j-2], Sin[i+4,j+2], Sin[i-2,j-4], Sin[i+2,j-4], Sin[i-2,j+4], Sin[i+2,j+4]\} \quad (17)$$

$$\min = \text{MIN}\{\min1, \min2, \min3\} \quad (18)$$

$$\text{if } (Sin[i,j] < \min - Th\min) \rightarrow Sout[i,j] = \min \quad (19)$$

The second embodiment described above allows same-color pixel referencing directions to be set with finer angular increments over the same-color pixel referencing directions set in conjunction with the hot pixel/cold pixel correction filters in the first embodiment. As a result, the image structure can be conserved with better reliability.

Third Embodiment

In the first and second embodiments described above, the pixel defect correction, i.e., the hot pixel/cold pixel correction, is executed within the camera where the color interpolation processing is subsequently executed. However, the color interpolation processing may be executed by an external application program and, in such a case, the image data will normally be saved as raw data having undergone only the pixel defect correction, without executing white balance adjustment. Accordingly, processing that may be executed under such circumstances is described in reference to the third embodiment.

Figure 7:
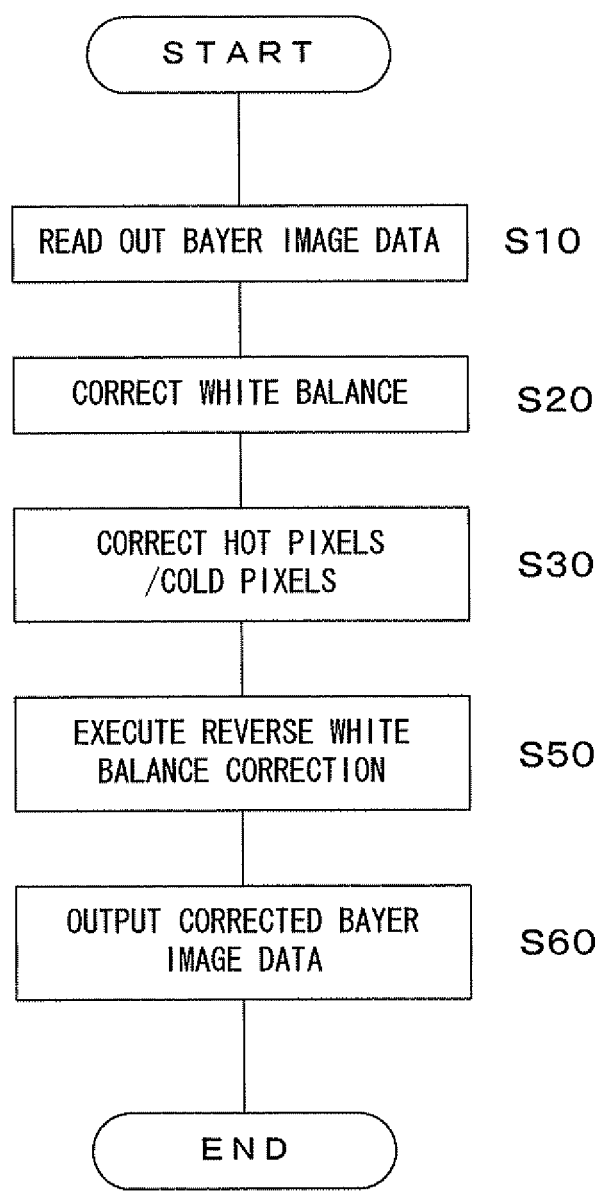
FIG. 7 presents a flowchart of the processing executed in a third embodiment.

FIG. 7 presents a flowchart of the processing executed in the third embodiment. In FIG. 7, the same step numbers are assigned to steps in which processing similar to that in the flowchart in FIG. 2 in reference to which the first embodiment has been described is executed so as to preclude the necessity for a repeated explanation. The following explanation thus focuses on differences from the flowchart in FIG. 2. It is to be noted that the processing in step S30 in FIG. 7 is executed by using the hot pixel/cold pixel correction filters described in reference to the first embodiment or the hot pixel/cold pixel correction filters described in reference to the second embodiment.

In step S50, the control device 103 executes reverse white balance correction. For instance, if the white balance gains among the R color, the G color and the B color are R/G=k1 and B/G=k2, as in the case described in reference to step S20 in the first embodiment, the control device 103 applies a gain equal to a multiple of 1/k1 to each R pixel on the Bayer plane and applies a gain equal to a multiple of 1/k2 to each B pixel on the Bayer plane. The operation then proceeds to step S60.

In step S60, the control device 103 outputs Bayer image data assuring bit accuracy, the level of which equals that of the input image data, and then ends the processing.

Through the third embodiment described above, Bayer image data having undergone the pixel defect correction alone can be output so as to allow the color interpolation processing to be relegated to an application program executed on another device such as a personal computer.

Fourth Embodiment

In the first through third embodiments described above, any pixel indicating a deviant pixel value compared to neighboring pixels is forcibly replaced with the maximum value or the minimum value among the values indicated at the neighboring pixels. A primary object of preventing breakdown of spatial image structure can be achieved through the method in the first through third embodiments, which assures better spatial resolving power over the prior art.

Figures 8A, 8B, 8C:
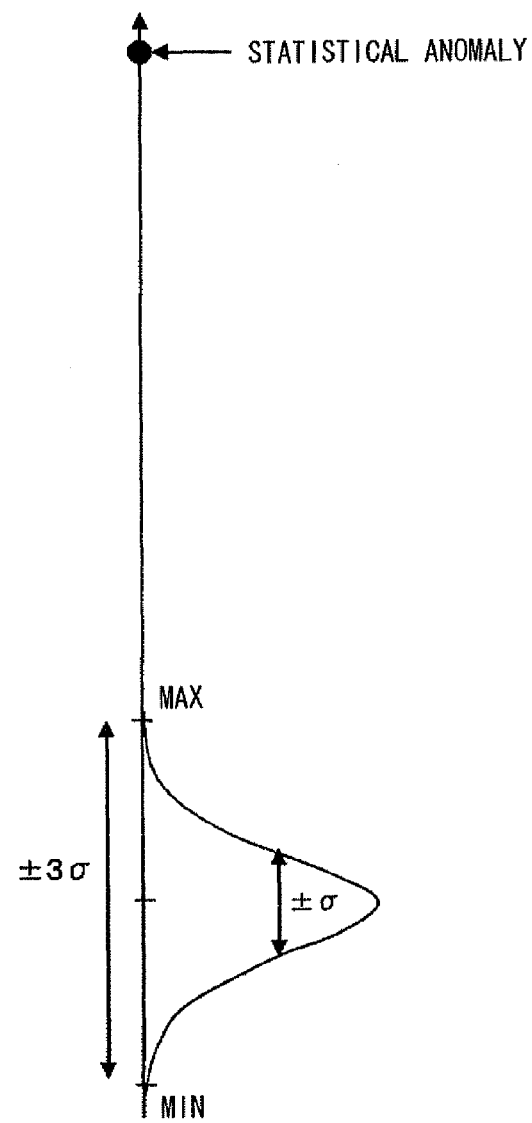
FIGS. 8A-8C schematically illustrate the hot pixel/cold pixel correction method adopted in a fourth embodiment.

Namely, there are issues yet to be effectively addressed in the related art in that since a hot pixel or a cold pixel is corrected by using same-color pixel signals sampled in the surrounding area, as shown in FIG. 8A, a color artifact manifesting coloration that cannot occur in reality may be induced around, for instance, a star in a celestial image (star color artifact) and that all bright spots are adjusted to assume a uniform brightness level and are thus resolved as a strange linear structure, as if the point images were all connected (point connection). There is another issue that the gradation contrast is bound to be lowered (gradational blur). The method described in reference to the first through third embodiments, in contrast, prevents the occurrence of star color artifacts or point connection, since different-color pixel signals output in the surrounding area at pixel positions further inward relative to the positions at which same-color pixel signals are output and closer to the correction target pixel position are also referenced.

However, thorough analysis of repaired images reveals that contrast indicating jagged structures in the actual image different from hot pixels or cold pixels, along the gradational direction tends to be lowered. Namely, the issue of gradational blur described earlier has not yet been fully addressed. It is desirable to assure a satisfactory level of image quality through adaptive processing by selectively eliminating deviant elements such as hot pixels and cold pixels without tampering with any regular image structure. As a method for achieving such adaptive processing, the threshold value for each filter, in reference to which a decision as to whether or not the target pixel is a deviant pixel is made, set to zero in the first through third embodiments, is adaptively switched to an optimal value in correspondence to image structures in this embodiment.

Under normal circumstances, a hot pixel signal or a cold pixel signal becomes noticeable when the pixel value indicated in the signal is extremely deviant relative to the pixel values indicated at surrounding pixels. Accordingly, a statistical distribution of image signals output at surrounding pixels may be investigated and any pixel deviating from the statistical distribution and manifesting as a white dot or a black dot may be regarded as a statistical anomaly. For instance, when the correction target pixel is part of a structurally flat image area, the distribution of the pixel values sampled at the 16 neighboring pixels in the first embodiment is expected to assume a Gaussian distribution pattern centered on the average value of the 16 pixel values and ranging over a width equal to a standard deviation value $\sigma$ corresponding to the 16 pixel values. The width of the standard deviation value $\sigma$ matches the noise fluctuation value at the ISO sensitivity level set at the image sensor via which the target image has been photographed. When the correction target pixel is part of an image area with an edge structure, in contrast, the pixel values will not assume such a Gaussian distribution pattern but rather, the signal values at the neighboring pixels will assume a distribution dependent upon the image structure corresponding to the amplitude of the edge structure.

Under these circumstances, a (max−min) value that has already been calculated may be taken as the threshold value. This threshold value is considered to represent a range of approximately ±3σ in a flat image area, as shown in FIG. 8C, since signal values in a normal distribution are bound to be contained within the ±3σ range with a 99.7% probability. In an edge area, on the other hand, the (max−min) value directly represents the contrast value itself of the image structure in the area. Accordingly, deviance decision-making can be executed by taking into consideration the contrast in the image structure in the surrounding area and the max filter or the Min filter can be applied simply by detecting a hot pixel or a cold pixel that is a pure statistical anomaly.

In the hot pixel decision-making where when the central pixel surrounded by neighboring pixels indicates a brightness level exceeding the sum of the maximum value among the neighboring pixel values and the threshold value (max+Th=max+(max−min)), the central pixel is replaced with the maximum value among the neighboring pixel values, when the subject pixel in an edge area deviates beyond the sum of the maximum value and the contrast value (max−min) of the image structure to result in a deviant white spot, it manifests as a very noticeable hot pixel and it is judged to be a pixel requiring deviance elimination.

Likewise, in the cold pixel decision-making where when the central pixel surrounded by neighboring pixels indicates a brightness level below the value (min−Th=min−(max−min)), the central pixel is replaced with the minimum value among the neighboring pixel values, when the subject pixel in an edge area deviates beyond the minimum value and further the contrast value (max−min) of the image structure to result in a deviant black spot, it manifests as a very noticeable cold pixel and it is judged to be a pixel requiring deviance elimination.

The (max−min) value used as the threshold value normally represents the width 6$\sigma$ relative to the noise fluctuation width a in a flat image area. Accordingly, a width adjustment term may be created by multiplying the (max−min) value by a constant, e.g., a width 3$\sigma$ obtained by multiplying the (max−min) value by ½, a width 2$\sigma$ obtained by multiplying the (max−min) value by ⅓ or a width 1$\sigma$ obtained by multiplying the (max−min) value by ⅙. In addition, instead of using the max value among the neighboring pixel values for substitution when correcting hot pixels, any value between the max value and the (max+Th) value, which is used in the deviance decision-making, may be used for substitution. Likewise, instead of using the min value among the neighboring pixel values for substitution when correcting cold pixels, any value between the min value and the (min−Th) value, which is used in the deviance decision-making, may be used for substitution.

In reference to the flowchart presented in FIG. 2, the processing executed in the embodiment is described below. It is to be noted that the processing executed in the fourth embodiment in steps other than step S30 in the flowchart presented in FIG. 2 is identical to that described in reference to the first embodiment and that the block diagram in FIG. 1 also applies to the fourth embodiment. Accordingly, a repeated explanation is not provided. The control device 103 in the fourth embodiment corrects hot pixels and cold pixels by using the Max filter and the Min filter functioning as expressed in (20) through (28) below in the procedural phases (13) and (C) in step S30 in the flowchart presented in FIG. 2.

$$\text{max1}=\text{MAX}\{Sin[i-1,j],Sin[i+1,j],Sin[i,j-1],Sin[i,j+1],Sin[i-1,j-1],Sin[i+1,j+1],Sin[i-1,j+1],Sin[i+1,j-1]\} \quad (20)$$

$$\text{max2}=\text{MAX}\{Sin[i-2,j],Sin[i+2,j],Sin[i,j-2],Sin[i,j+2],Sin[i-2,j-2],Sin[i+2,j+2],Sin[i-2,j+2],Sin[i+2,j-2]\} \quad (21)$$

$$\text{max}=\text{MAX}\{\text{max1},\text{max2}\} \quad (22)$$

$$\text{min1}=\text{MIN}\{Sin[i-1,j],Sin[i+1,j],Sin[i,j-1],Sin[i,j+1],Sin[i-1,j-1],Sin[i+1,j+1],Sin[i-1,j+1],Sin[i+1,j-1]\} \quad (23)$$

$$\text{min2}=\text{MIN}\{Sin[i-2,j],Sin[i+2,j],Sin[i,j-2],Sin[i,j+2],Sin[i-2,j-2],Sin[i+2,j+2],Sin[i-2,j+2],Sin[i+2,j-2]\} \quad (24)$$

$$\text{min}=\text{MIN}\{\text{min1},\text{min2}\} \quad (25)$$

$$Th=(\text{max}-\text{min})*\alpha \quad (26)$$

$$\text{if } (Sin[i,j]\geq \text{max}+Th)\rightarrow Sout[i,j]=\text{max}+Th' \quad (27)$$

$$\text{if } (Sin[i,j]\leq \text{min}-Th)\rightarrow Sout[i,j]=\text{min}+Th' \quad (28)$$

While the constant multiplier $\alpha$ in expression (26) may take a value within a range of 0 to 1, it is typically set to 1. Other values that may be typically set for $\alpha$ are ½, ⅓ and ⅙, as explained earlier. In addition, Th' should take a value within a range of 0 to Th. Namely, Th' is a function of Th. For instance, Th' may be set to Th×$\beta$ by incorporating a constant multiplier $\beta$ assuming a value within the range of 0 to 1. Th' would normally be set to 0.

By setting the difference between the max value and the min value, both already calculated as substitution values, as the threshold value described above, statistical decision-making processing for detecting deviant pixels along the gradational direction can be achieved through an extremely simple approach. Namely, by detecting a deviant pixel based upon the (max−min) value, which changes in correspondence to the local image structure, a statistical anomaly can be adaptively detected and ultimately, any truly deviant pixels can be correctly judged to be hot pixels or cold pixels and eliminated while disallowing any decrease in the gradational contrast through filtering.

Through these measures, a celestial image of, for instance, the Milky Way, where numerous stars having low brightness are gathered, can be reproduced faithfully with all the stars resolved by keeping the image contrast intact, while, at the same time, disallowing any decrease in the contrast in textured areas of the image. Furthermore, any hot pixels/cold pixels resulting from a necessarily lengthy exposure in celestial photography can be cleanly eliminated. Since the modification achieved through the method described above can easily be adopted in the method described in reference to the second embodiment and the third embodiment, details of such applications are not explained.

Fifth Embodiment

In the first through fourth embodiments described above, both same-color pixel values and different-color pixel values are used as neighboring pixel values invariably for any correction target pixel, i.e., a correction target pixel taking up an R pixel position, a G pixel position or a B pixel position in the Bayer plane. Such a referencing range can be easily assumed in software. However, in hardware applications such as ASIC applications and FPGA applications, the circuit scale will be limited and thus it may not be possible to allow even the 5×5 pixel referencing range having been described in reference to the first embodiment and the fourth embodiment. An alternative approach that may be taken under such circumstances is described in reference to the fifth embodiment.

Figure 9:
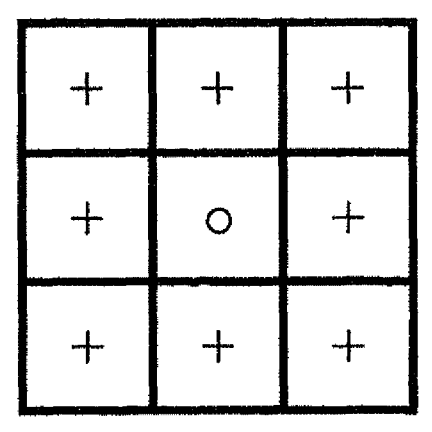

More specifically, pixels within the minimum range, i.e., the 3×3 pixel range centered on the correction target pixel indicated by "0", are referenced as shown in FIG. 9. In such a case, only different-color pixels will be referenced for the correction target pixel taking up an R pixel position or a B pixel position in the Bayer plane. Both same-color pixels and different-color pixels will be referenced for the correction target pixel taking up a G pixel position. Thus, while the resulting image quality may be slightly inferior to that achieved through the fourth embodiment, the circuit scale can be reduced. In this case, too, improvements in the spatial resolving power and the gradational resolving power over the related art are assured.

The following is a description of the processing executed in the embodiment, given in reference to the flowchart presented in FIG. 2. It is to be noted that the following explanation focuses on the difference from the fourth embodiment and that a repeated explanation of processing similar to that in the fourth embodiment is not provided. In the fifth embodiment, hot pixels and cold pixels are corrected by using a Max filter and a Min filter functioning as expressed in (29) through (33) below, which sample at least different color adjacent pixels present within the 3×3 pixel range, in the procedural phases (B) and (C) executed in step S30 in the flowchart presented in FIG. 2.

$$\max=\text{MAX}\{Sin[i-1,j],Sin[i+1,j],Sin[I,j-1],Sin[i,j+1], \\ Sin[i-1,j-1],Sin[i+1,j+1],Sin[i-1,j+1],Sin[i+1,j-1]\} \quad (29)$$

$$\min=\text{MIN}\{Sin[i-1,j],Sin[i+1,j],Sin[i,j-1],Sin[i,j+1], \\ Sin[i-1,j-1],Sin[i+1,j+1],Sin[i-1,j+1],Sin[i+1,j-1]\} \quad (30)$$

$$Th=(\max-\min)*\alpha \quad (31)$$

$$\text{if } (Sin[i,j] \geq \max+Th) \rightarrow Sout[i,j]=\max+Th' \quad (32)$$

$$\text{if } (Sin[i,j] \leq \min-Th) \rightarrow Sout[i,j]=\min+Th' \quad (33)$$

It is to be noted that the constant multiplier ac in expression (31) and Th' in expressions (32) and (33) are set as has been described in reference to the fourth embodiment.

Sixth Embodiment

The adaptive threshold values used in conjunction with the Max/Min filters for purposes of statistical decision-making as has been described in reference to the fourth embodiment may be adopted to improve Max/Min filters used for standard images, as well as the Max/Min filters used to process Bayer images. In other words, such threshold values may be used when correcting hot pixels/cold pixels in an image captured through lengthy exposure via a monochromatic image sensor, or when correcting hot pixels/cold pixels in an image captured via a three-layer color image sensor. Furthermore, a similar approach may be taken in conjunction with a color image obtained by interpolating a color image generated via a single plate color image sensor. Since the concept can be adopted in conjunction with color images simply by repeatedly executing monochromatic image processing for the individual image planes, i.e., the R plane, the G plane and the B plane, or the Y plane, the Cb plane and the Cr plane obtained through YCbCr conversion, a specific application example in which the present invention is adopted to process a monochrome image is described below.

The control device 103 obtains monochromatic image data. In more specific terms, monochromatic image data assuming linear gradation relative to the amount of light are input to the control device 103. The monochromatic image data may have undergone gamma correction. It has been confirmed through testing that the method of adaptation adopted in the embodiment successfully enables accurate decision-making for statistical anomalies regardless of whether or not the target image data have undergone gamma correction. The control device 103 corrects hot pixels and cold pixels in the monochromatic image data having been input thereto is described below.

The control device 103 first copies the data as expressed in (1) and saves the copied monochromatic image data in the Sin buffer memory. Subsequently, it corrects hot pixels and cold pixels by using the Max filter and the Min filter functioning as expressed in (34) through (38) below. In more specific terms, it corrects hot pixels and hold pixel by using the Max filter and the Min filter, which reference the eight neighboring pixels present within the 3×3 pixel range centered on the correction target pixel indicated by "O", as shown in FIG. 9. It is to be noted that the constant multiplier α and Th' in expressions (34) through (38) are set as has been described in reference to the fourth embodiment.

$$\max=\text{MAX}\{Sin[i-1,j],Sin[i+1,j],Sin[i,j-1],Sin[i,j+1], \\ Sin[i-1,j-1],Sin[i+1,j+1],Sin[i-1,j+1],Sin[i+1,j-1]\} \quad (34)$$

$$\min=\text{MIN}\{Sin[i-1,j],Sin[i+1,j],Sin[i,j-1],Sin[i,j+1], \\ Sin[i-1,j-1],Sin[i+1,j+1],Sin[i-1,j+1],Sin[i+1,j-1]\} \quad (35)$$

$$Th=(\max-\min)*\alpha \quad (36)$$

$$\text{if } (Sin[i,j] \geq \max+Th) \rightarrow Sout[i,j]=\max+Th' \quad (37)$$

$$\text{if } (Sin[i,j] \leq \min-Th) \rightarrow Sout[i,j]=\min+Th' \quad (38)$$

Through the processing described above, hot pixels/cold pixels in standard monochrome or color images, too, can be corrected accurately while minimizing the extent to which the textural contrast or the contrast in, for instance, an image of stars with low brightness is reduced.

—Variations—

It is to be noted that the cameras achieved in the embodiments described above allow for the following variations.

(1) In the first through fourth embodiments, the bit accuracy required to express the maximum gain must be assured as a working bit depth margin while processing the image data with the white balance application in effect, so as to sustain a satisfactory level of bit accuracy both for the input image and the output image. However, it may not always be possible to temporarily raise the working bit accuracy without creating a problem. In such a case, white balance level adjustment may be individually incorporated in the hot pixel/cold pixel correction phases. More specifically, if the current correction target pixel is a G pixel, the hot pixel correction filter or the cold pixel correction filter should be applied in conjunction with reference values obtained by multiplying the neighboring R pixel values by a white balance gain of R/G=k1 and by multiplying the neighboring B pixel values by a white balance gain of B/G=k2.

If, on the other hand, the current correction target pixel is an R pixel, the hot pixel correction filter or the cold pixel correction filter should be applied in conjunction with reference values obtained by multiplying the neighboring pixel values by a white balance gain of G/R=1/k1 and by multiplying the neighboring B pixel values by a white balance gain of B/R=k2/k1. Likewise, if the current correction target pixel is a B pixel, the hot pixel correction filter or the cold pixel correction filter should be applied in conjunction with reference values obtained by multiplying the neighboring G pixel values by a white balance gain of G/B=1/k2 and by multiplying the neighboring R pixel values by a white balance gain of R/B=k1/k2.

The data Sout[i, j] output as a result can be directly handled as Bayer image data, assuring bit accuracy matching that of the data Sin[i, j] that have not undergone white balance adjustment. In this case, since the working bits are not expanded, four different image input patterns, each corresponding to one of the four different categories of pixel positions, R, Gr, Gb and B in the Bayer array, must be used when inputting the image data. It is to be noted that the notation Gr indicates a G pixel with R pixels present adjacent to it along the horizontal direction, whereas the notation Gb indicates a G pixel with B pixels present adjacent to it along the horizontal direction.

(2) The first through fourth embodiments have been described by assuming that the image sensor 102 is a single plate color image sensor with a Bayer array and that image data are output from a square grid array assumed at the image sensor 102. However, the present invention may be adopted in an image sensor 102 constituted with a single plate image sensor with an array other than a Bayer array. For instance, the hot pixel/cold pixel correction filters having been described in reference to the first through third embodiments may be used simply by rotating them by 45° in conjunction with a honeycomb array that is achieved by rotating the Bayer array by 45°. Namely, the concept of filters configured so as to reference different-color pixels can be adopted with ease in conjunction with another color array. Examples of such alternative color filter arrays include a G-stripe RB checker array and a non-square grid delta array.

(3) In the first, second and fourth embodiments described above, the color interpolation processing is executed after the hot pixel/cold pixel correction. Under such circumstances, output gamma correction will be ultimately applied on the data having undergone the color interpolation processing so as to ready them as display data to be brought up on display at the monitor 105. While there are various viable methodologies that may be adopted with respect to color interpolation processing, one of the simplest among them may be to execute the output gamma correction on the Bayer image data first and then to execute the color interpolation processing.

While the hot pixel/cold pixel correction described above is executed on Bayer data assuming linear gradation relative to the amount of light, the relation of the correction target pixel value to the maximum value and the minimum value with which the pixel value is compared remain unaffected, regardless of whether or not the data have undergone gamma correction. For this reason, the hot pixel/cold pixel correction may be executed on Bayer data having undergone gamma correction. In other words, the control device 103 may execute gamma correction after executing the white balance correction in step S20 and then execute the hot pixel/cold pixel correction in step S30 in the flowchart presented in FIG. 2.

In each of the first through fourth embodiments described above, the processing in FIG. 2 or FIG. 7 is executed in the camera 100. However, the present invention may be adopted in another device, such as a personal computer, capable of executing the processing in FIG. 2 or FIG. 7 on Bayer image data input thereto. In such a case, a program enabling execution of the processing in FIG. 2 or FIG. 7 should be recorded in a device such as a personal computer so as to correct hot pixels/cold pixels in Bayer image data input to the device as the device executes the program.

Figure 10:
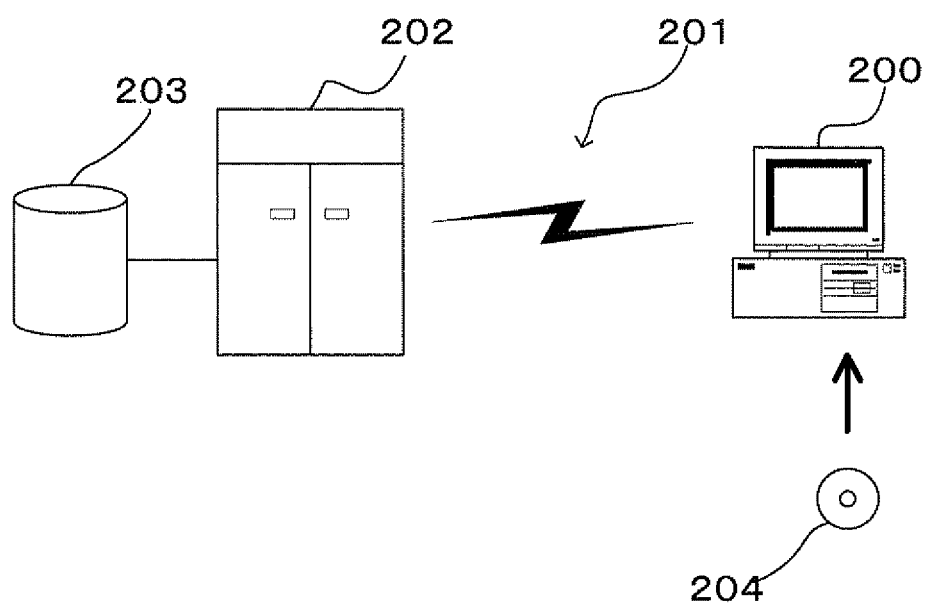
FIG. 10 shows how the program may be provided.

The program may be provided in a recording medium such as a CD-ROM or in a data signal on the Internet or the like. FIG. 10 shows how the program may be provided. A personal computer 200 receives the program via a CD-ROM 204. The personal computer 200 is also capable of connecting with a communication line 201. A computer 202 is a server computer that provides the program stored in a recording medium such as a hard disk 203. The communication line 201 may be the Internet or a dedicated communication line. The computer 202 reads out the program from the hard disk 203 and transmits the program thus read out to the personal computer 200 via the communication line 201. Namely, the program embodied as a data signal on a carrier wave is transmitted via the communication line 201. In short, the program may be distributed as a computer-readable computer program product assuming any of various modes including a recording medium and a data signal (carrier wave).

It is to be noted that the embodiments described above simply represent examples and the present invention is in no way limited to these examples as long as the functions characterizing the present invention remain intact. In addition, any of the embodiments may be adopted in combination with a plurality of variations.

What is claimed is:

1. An image processing device that corrects a pixel value in image data, comprising:
    an input unit that inputs image data having a plurality of color components and including a plurality of pixels each holding one color component among the plurality of color components;
    a calculation unit that calculates a maximum value among pixel values of a plurality of same-color neighboring pixels and pixel values of a plurality of different-color neighboring pixels, each of the plurality of same-color neighboring pixels holding a color component identical to a color component held in a processing target pixel selected from the pixels included in the image data, each of the plurality of different-color neighboring pixels holding a color component different from the color component held in the processing target pixel, the plurality of different-color neighboring pixels being located closer to the processing target pixel than the plurality of same-color neighboring pixels; and
    a correction unit that compares a pixel value of the processing target pixel with the maximum value and replaces the pixel value of the processing target pixel with the maximum value if the pixel value of the processing target pixel is greater than the maximum value.

2. An image processing device according to claim 1, wherein:
    the calculation unit references the pixel values of the different-color pixels having undergone gain adjustment executed in reference to the color component held in the processing target pixel by using a white balance adjustment value determined in advance among the color components of the image data.

3. An image processing device according to claim 1, wherein:
    when the image data assumes a square grid array format, the calculation unit uses pixel values of different-color pixels present within a 3×3 pixel range centered on the processing target pixel as the pixel values of the plurality of different-color neighboring pixels.

4. An image processing device that corrects a pixel value in image data, comprising:
    an input unit that inputs image data having a plurality of color components and including a plurality of pixels each holding one color component among the plurality of color components;
    a calculation unit that calculates a maximum value among pixel values of a plurality of neighboring pixels, which include, at least, pixel values of a plurality of different-color neighboring pixels each holding a color component different from a color component held in a processing target pixel selected from the pixels included in the image data, the plurality of different-color neighboring pixels being located closer to the processing target pixel than a plurality of same-color neighboring pixels each holding a color component identical to the color component held in the processing target pixel; and
    a correction unit that compares a pixel value of the processing target pixel with the maximum value and replaces the pixel value of the processing target pixel with the maximum value if the pixel value of the processing target pixel is greater than the maximum value.

5. An image processing device according to claim 4, wherein:
    the calculation unit references the pixel values of the different-color pixels having undergone gain adjustment executed in reference to the color component held in the processing target pixel by using a white balance adjustment value determined in advance among the color components of the image data.

6. An image processing device according to claim 4, wherein:
when the image data assumes a square grid array format, the calculation unit uses pixel values of different-color pixels present within a 3×3 pixel range centered on the processing target pixel as the pixel values of the plurality of different-color neighboring pixels.

7. An image processing device that corrects a pixel value in image data, comprising:
an input unit that inputs image data having a plurality of color components and including a plurality of pixels each holding one color component among the plurality of color components;
a calculation unit that calculates a minimum value among pixel values of a plurality of same-color neighboring pixels and pixel values of a plurality of different-color neighboring pixels, each of the plurality of same-color neighboring pixels holding a color components identical to a color component held in a processing target pixel selected from the pixels included in the image data, each of the plurality of different-color neighboring pixels holding a color component different from the color component held in the processing target pixel, the plurality of different-color neighboring pixels being located closer to the processing target pixel than the plurality of same-color neighboring pixels; and
a correction unit that compares a pixel value of the processing target pixel with the minimum value and replaces the pixel value of the processing target pixel with the minimum value if the pixel value of the processing target pixel is smaller than the minimum value.

8. An image processing device according to claim 7, wherein:
the calculation unit references the pixel values of the different-color pixels having undergone gain adjustment executed in reference to the color component held in the processing target pixel by using a white balance adjustment value determined in advance among the color components of the image data.

9. An image processing device according to claim 7, wherein:
when the image data assumes a square grid array format, the calculation unit uses pixel values of different-color pixels present within a 3×3 pixel range centered on the processing target pixel as the pixel values of the plurality of different-color neighboring pixels.

10. An image processing device that corrects a pixel value in image data, comprising:
an input unit that inputs image data having a plurality of color components and including a plurality of pixels each holding one color component among the plurality of color components;
a calculation unit that calculates a minimum value among pixel values of a plurality of neighboring pixels, which include, at least, pixel values of a plurality of different-color neighboring pixels each holding a color component different from a color component held in a processing target pixel selected from the pixels included in the image data, the plurality of different-color neighboring pixels being located closer to the processing target pixel than a plurality of same-color neighboring pixels each holding a color component identical to the color component held in the processing target pixel; and
a correction unit that compares a pixel value of the processing target pixel with the minimum value and replaces the pixel value of the processing target pixel with the minimum value if the pixel value of the processing target pixel is smaller than the minimum value.

11. An image processing device according to claim 10, wherein:
the calculation unit references the pixel values of the different-color pixels having undergone gain adjustment executed in reference to the color component held in the processing target pixel by using a white balance adjustment value determined in advance among the color components of the image data.

12. An image processing device according to claim 10, wherein:
when the image data assumes a square grid array format, the calculation unit uses pixel values of different-color pixels present within a 3×3 pixel range centered on the processing target pixel as the pixel values of the plurality of different-color neighboring pixels.

13. An image processing device that corrects a pixel value in image data, comprising:
an input unit that inputs image data having a plurality of color components and including a plurality of pixels each holding one color component among the plurality of color components;
a calculation unit that calculates a maximum value among pixel values of a plurality of same-color neighboring pixels and pixel values of a plurality of different-color neighboring pixels, each of the plurality of same-color neighboring pixels holding a color component identical to a color component held in a processing target pixel selected from the pixels included in the image data, each of the plurality of different-color neighboring pixels holding a color component different from the color component held in the processing target pixel, the plurality of different-color neighboring pixels being located closer to the processing target pixel than the plurality of same-color neighboring pixels; and
a correction unit that compares a pixel value of the processing target pixel with the maximum value and replaces the pixel value of the processing target pixel with the maximum value if the pixel value of the processing target pixel is greater than the maximum value, wherein
the calculation unit further calculates a minimum value among the pixel values of the pixels having been referenced when calculating the maximum value;
the image processing device further comprises a setting unit that calculates a difference by subtracting the minimum value from the maximum value having been calculated and sets a value obtained by multiplying the difference by a constant as a threshold value for the processing target pixel; and
the correction unit compares the pixel value of the processing target pixel with a sum obtained by adding the threshold value to the maximum value and replaces the pixel value of the processing target pixel with the maximum value if the pixel value of the processing target pixel is greater than the sum.

14. An image processing device that corrects a pixel value in image data, comprising:
an input unit that inputs image data having a plurality of color components and including a plurality of pixels each holding one color component among the plurality of color components;

a calculation unit that calculates a maximum value among pixel values of a plurality of neighboring pixels, which include, at least, pixel values of a plurality of different-color neighboring pixels each holding a color component different from a color component held in a processing target pixel selected from the pixels included in the image data, the plurality of different-color neighboring pixels being located closer to the processing target pixel than a plurality of same-color neighboring pixels each holding a color component identical to the color component held in the processing target pixel; and a correction unit that compares a pixel value of the processing target pixel with the maximum value and replaces the pixel value of the processing target pixel with the maximum value if the pixel value of the processing target pixel is greater than the maximum value, wherein the calculation unit further calculates a minimum value among the pixel values of the pixels having been referenced when calculating the maximum value;

the image processing device further comprises a setting unit that calculates a difference by subtracting the minimum value from the maximum value having been calculated and sets a value obtained by multiplying the difference by a constant as a threshold value for the processing target pixel; and the correction unit compares the pixel value of the processing target pixel with a sum obtained by adding the threshold value to the maximum value and replaces the pixel value of the processing target pixel with the maximum value if the pixel value of the processing target pixel is greater than the sum.

15. An image processing device that corrects a pixel value in image data, comprising:

an input unit that inputs image data having a plurality of color components and including a plurality of pixels each holding one color component among the plurality of color components;

a calculation unit that calculates a minimum value among pixel values of a plurality of same-color neighboring pixels and pixel values of a plurality of different-color neighboring pixels, each of the plurality of same-color neighboring pixels holding a color components identical to a color component held in a processing target pixel selected from the pixels included in the image data, each of the plurality of different-color neighboring pixels holding a color component different from the color component held in the processing target pixel, the plurality of different-color neighboring pixels being located closer to the processing target pixel than the plurality of same-color neighboring pixels; and a correction unit that compares a pixel value of the processing target pixel with the minimum value and replaces the pixel value of the processing target pixel with the minimum value if the pixel value of the processing target pixel is smaller than the minimum value, wherein the calculation unit further calculates a maximum value among the pixel values of the pixels having been referenced when calculating the minimum value;

the image processing device further comprises a setting unit that calculates a difference by subtracting the minimum value from the maximum value having been calculated and sets a value obtained by multiplying the difference by a constant as a threshold value for the processing target pixel; and the correction unit compares the pixel value of the processing target pixel with a remainder obtained by subtracting the threshold value from the minimum value and replaces the pixel value of the processing target pixel with a minimum value if the pixel value of the processing target pixel is smaller than the remainder.

16. An image processing device that corrects a pixel value in image data, comprising:

an input unit that inputs image data having a plurality of color components and including a plurality of pixels each holding one color component among the plurality of color components;

a calculation unit that calculates a minimum value among pixel values of a plurality of neighboring pixels, which include, at least, pixel values of a plurality of different-color neighboring pixels each holding a color component different from a color component held in a processing target pixel selected from the pixels included in the image data, the plurality of different-color neighboring pixels being located closer to the processing target pixel than a plurality of same-color neighboring pixels each holding a color component identical to the color component held in the processing target pixel; and a correction unit that compares a pixel value of the processing target pixel with the minimum value and replaces the pixel value of the processing target pixel with the minimum value if the pixel value of the processing target pixel is smaller than the minimum value, wherein the calculation unit further calculates a maximum value among the pixel values of the pixels having been referenced when calculating the minimum value;

the image processing device further comprises a setting unit that calculates a difference by subtracting the minimum value from the maximum value having been calculated and sets a value obtained by multiplying the difference by a constant as a threshold value for the processing target pixel; and the correction unit compares the pixel value of the processing target pixel with a remainder obtained by subtracting the threshold value from the minimum value and replaces the pixel value of the processing target pixel with a minimum value if the pixel value of the processing target pixel is even smaller than the remainder.

* * * * *